United States Patent [19]

Smith

[11] 4,350,776

[45] Sep. 21, 1982

[54] METHOD OF MAKING A LOW-FRIABILITY, THERMOSETTING FOAM

[75] Inventor: Stuart B. Smith, Conyers, Ga.

[73] Assignee: Thermoset AG, Switzerland

[21] Appl. No.: 238,467

[22] Filed: Feb. 26, 1981

[51] Int. Cl.³ .............................................. C08J 9/14
[52] U.S. Cl. .................................... 521/110; 521/121; 521/136; 521/149; 521/181
[58] Field of Search ............... 521/136, 181, 110, 121, 521/149

[56] References Cited

U.S. PATENT DOCUMENTS 3,692,706  9/1972  Igglesden ............................ 521/136
3,919,127  11/1975 Larsen et al. ....................... 521/136
3,975,319  8/1976  Larsen et al. ....................... 521/136

Primary Examiner—Morton Foelak
Attorney, Agent, or Firm—Richard P. Crowley

[57] ABSTRACT

A low-friability, flame-retardant, thermosetting foam product is prepared by reacting, in the presence of a blowing agent and a strong acid catalyst, a furfuryl-alcohol polymer and a phenol-formaldehyde resin, having a mole ratio of phenol to formaldehyde of from about 1:1.2 to 1:2.0, which reaction provides a low-friability, flame-retardant, thermosetting foam product.

15 Claims, No Drawings

METHOD OF MAKING A LOW-FRIABILITY, THERMOSETTING FOAM

BACKGROUND OF THE INVENTION

Thermosetting foam products prepared by the use of phenol-formaldehyde, blowing agents and an acidic catalyst typically are characterized by having a fairly brittle foam structure with low compression strength and exhibiting high-friability properties.

Furfural is an aldehyde which has been employed in various condensation reactions with many types of compounds, such as, for example, phenol, to produce condensation products. Phenol furfural resin compositions have been prepared, for example, by employing a polyalkylene polyphenol and furfural, which provides for a flexible, thermosetting resin product suitable for use in coatings and as molding compounds. Such phenol furfural resin compositions and others are described, for example, in U.S. Pat. Nos. 3,471,443 and 3,244,648.

SUMMARY OF THE INVENTION

My invention relates to a thermosetting foam product, to the method of preparing the foam product, and, in particular, to a thermosetting foam product characterized by low friability and flame resistance, and more particularly to a thermosetting foam product prepared by reacting a furfuryl-alcohol polymer with a phenol-formaldehyde resin.

I have found that a unique thermosetting foam product may be prepared which is characterized by low friability, toughness and flame resistance, by the reaction, in the presence of a blowing agent and a strong acid catalyst, of a furfuryl-alcohol polymer and a phenol-formaldehyde resin. Further, the thermosetting foam product produced provides a superior-quality foam product as regards strength characteristics and overall foam structure. The thermosetting foam product has good flame resistance and controllable foaming characteristics which enable its use with conventional foaming equipment.

The preparation of foams employing straight furfuryl alcohol, alone or in combination with phenol-formaldehyde resins, does not produce an acceptable thermosetting foam product, but, in fact, provides for hard-to-control reactions and results in thermosetting foams which are weak, brittle and generally of very nonuniform and poor cell structure. Such foam products as produced are characterized by large cells which appear to be predominantly open cells. Such thermosetting foam products would not be of commercial interest.

In one embodiment, a preferred and high-quality thermosetting foam product of my invention is prepared through the reaction of a one-stage phenol-formaldehyde resin; for example, wherein the mole ratio of the phenol to formaldehyde ranges from about 1:1.2 to 1:2.0; for example, 1:1.2 to 1:1.4, and the use of a furfuryl-alcohol polymer prepared by acid catalysis under controlled conditions of furfuryl alcohol, to provide for a polymer generally having a head-to-tail polymerization of the furfuryl alcohol. The unique thermosetting foam product produced by such a reaction of such ingredients provides for a foam which is substantially of fine, uniform cell structure. While not wishing to be bound by any particular theory of operation, it appears that the thermosetting foam product is cured by generally simultaneous reactions in the reaction mixture, wherein the acidified phenolic resin cures by condensation by means of a generated exotherm, while the furfuryl-alcohol polymer cures by polymerization by means of lowering the acidic pH to the acid-cure level for the furfuryl polymer. The selected and synergistic acid consumption, the controlled heat generation by means of cross-linking and generally simultaneous progress of both the condensation reaction of the phenolic resin and the further polymerization reaction of the furfuryl-alcohol polymer, provides for a unique foam, which, when completely cured in a thermosetting state, is strong, resilient, flame-resistant and has low friability when aged.

In the preparation of my thermosetting foam product, the furfuryl-alcohol polymer and the phenol-formaldehyde resin are reacted in the presence of a strong acid catalyst in an amount sufficient to effect the complete cure of the resulting foam; that is, the condensation of the phenolic resin and the further polymerization of the furfuryl-alcohol polymer, and also in the presence of an expandable amount of a blowing agent.

Typical blowing agents which may be employed, in preparing my thermosetting foam product, include physical and chemical blowing agents, as well as mechanical blowing techniques, but the preferred blowing agent and technique comprise the employment of liquid physical blowing agents which are volatile liquids introduced into the reaction mixture, and which produce a blowing gas through vaporization of the blowing agent, or through decomposition of the blowing agent during the exotherm. Suitable blowing agents are short-chain aliphatic hydrocarbons; for example, in the $C_3$–$C_7$ range, and their chlorinated and fluorinated analogs, such as fluoro and chloro alkanes known as Freon (a registered trademark of E. I. du Pont de Nemours & Co.) and methylene chloride and similar blowing agents. The blowing agents may be employed in amounts ranging from about 0.5 to 15 parts; for example, 1 to 10 parts per 100 parts by weight of the resin polymer employed in the reaction mixture.

Further, it is desirable and necessary to employ, within the reaction mixture in preparing the thermosetting foam product of the invention, a small, but effective, amount of a surfactant to act as a cell-control or nucleating agent, to produce a uniform, fine, cellular structure. Typical surfactants employed would include silicone surfactants in the amount generally of from 0.05 to 5 parts by weight; for example, 0.1 to 2 parts by weight, of the surfactant to the 100 parts by weight of the resin polymer in the reaction mixture. Typical silicone surfactants which may be employed include non-hydrolyzable silicone surfactants, such as those described in U.S. Pat. Nos. 3,772,224 and 3,849,156, and those polyalkylene glycol silicones and block copolymers.

A wide variety of strong acid catalysts may be employed in the reaction mixture, to provide for a pH of approximately 1.5 to 5 in the reaction mixture, to effect the condensation and polymerization reactions. Typical acid catalysts suitable for use would include phosphoric and sulfonic acid catalysts, such as sulfonic acid, phosphoric acid, toluene sulfonic acid and alkane sulfonic acid, such as methane sulfonic acid, as well as strong organic acids, such as oxalic acid, and hydrochloric acid and sulfuric acid. The acid catalyst may be employed in minor amounts sufficient to effect the desired reaction, but typically ranges from about 0.5 to 15 parts; for example, 1 to 10 parts, by weight of the acid catalyst per 100 parts by weight of the resin polymer employed in the reaction mixture.

Also, it has been found that the addition of a small amount of from about 0.1 to 8.0 weight percent; for example, 0.5% to 5%, to the reaction mixture of a styrene monomer provides a foam which has a substantially closed-cell structure. The styrene monomer may comprise styrene or an alkyl styrene, such as methyl styrene, or other styrene monomers or combinations thereof. It has been observed that the addition of a styrene monomer reduces the reaction mixture exotherm, and, while not wishing to be bound by any theory or mechanism of operation, the reduced exotherm may reduce the number of cell ruptures, permitting the formation of a closed-cell foam product.

Optionally, as desired, a wide variety of other chemicals, additives, fillers, property enhancers and reinforcers may be incorporated in the resinous reaction mixture, such as, for example, antioxidants, antistatic agents, biocides, dyes, fibers, particles, clays, fillers, flame retardants, fungicides, heat stabilizers, lubricants, plasticizers, viscosity-control agents and the like.

In the method of preparing the thermosetting foam products, the furfuryl-alcohol polymer, having reactive free-hydroxy groups, and the single-stage phenol-formaldehyde resin are mixed together and are mixed with the blowing agent and other materials and an acid catalyst added, to generate the exotherm and to provide for the curing of both the phenolic resin and the furfuryl polymer. The reaction may be commenced at room temperature and may be carried out commencing from about 60° F. and range from the exotherm to 250° F.; for example, from 80° F. with the exotherm rising to 180° F. In practice, the mixture of the weight percent of the furfuryl polymer and the phenol-formaldehyde resin employed may vary from about 10% to 90%. However, due to the high cost of the furfuryl-alcohol polymer, it is often desired to employ a majority of the reaction mixture as the phenol formaldehyde, and, thus, the amount of furfuryl-alcohol polymer to phenol-formaldehyde resin may vary, in the preferred embodiment, from 30% to 70%.

My unique thermosetting foam product and the method of preparing the foam product will be set forth for the purpose of illustration only in certain embodiments; however, it is recognized that various changes, modifications and improvements may be made thereon by a person skilled in the art, all falling within the scope and content of my invention.

DESCRIPTION OF THE EMBODIMENTS

Example 1

A thermosetting reaction mixture was prepared at room temperature by mixing together the following formulation:

| | | Parts by Weight |
|---|---|---|
| 1. | Furfuryl-alcohol polymer - QX 1300* | 100 |
| 2. | Phenol-formaldehyde resin - 2014/94** | 50 |
| 3. | Surfactant (DC 193 - a silicone surfactant of Dow-Corning Co.) | 2 |
| 4. | Blowing agent - Freon 11 (a product of E. I. du Pont de Nemours & Co.) | 10 |
| 5. | Acid catalyst - methane sulfonic acid | 10 |
| | TOTAL | 172 |

*a furfuryl-alcohol polymer, thixotropic solution of Quaker Oats Company, viscosity 320 cps, specific gravity 1.36
**a phenol-formaldehyde resin of Georgia Pacific Corp., mole ratio of phenol to formaldehyde 1.0 to 1.4, viscosity 2000 cps, specific gravity 1.26, free phenol 10%, free formaldehyde 1%, solids 75%

The reaction mixture had an exotherm to 150° F. and produced a very fine-cell, closed-foam structure having a density of 1.5 pounds per cubic foot and a compressure strength of 15 psi and low friability on aging.

Example 2

A thermosetting reaction mixture was prepared at room temperature by mixing together the following formulation:

| | | Parts by Weight |
|---|---|---|
| 1. | Furfuryl-alcohol polymer - QX 1300 | 20 |
| 2. | Phenol-formaldehyde resin - 2014/94 | 100 |
| 3. | Surfactant (DC 193) | 2 |
| 4. | Blowing agent - Freon 11 | 10 |
| 5. | Acid catalyst - methane sulfonic acid | 10 |
| | TOTAL | 142 |

A foam of 1.5 pcf density was produced with very fine cells, compressure strength 10 psi, temperature of resin 170° F., and was low in friability.

Example 3

A thermosetting reaction mixture was prepared at room temperature by mixing together the following formulation:

| | | Parts by Weight |
|---|---|---|
| 1. | Phenol-formaldehyde resin - 2014/94 | 100 |
| 2. | Surfactant (DC 193) | 2 |
| 3. | Blowing agent - Freon 11 | 10 |
| 4. | Acid catalyst - methane sulfonic acid | 10 |
| | TOTAL | 122 |

The phenol-formaldehyde foam produced from this reaction had a density of 1.5 pcf and was produced with a fine-cell structure; however, the foam exhibited very low compressure strength of 6 psi or less and high friability.

Example 4

A thermosetting reaction mixture was prepared at room temperature by mixing together the following formulation:

| | | Parts by Weight |
|---|---|---|
| 1. | Furfuryl alcohol | 100 |
| 2. | Surfactant (DC 193) | 2 |
| 3. | Blowing agent - Freon 11 | 10 |
| 4. | Acid catalyst - methane sulfonic acid | 10 |
| | TOTAL | 122 |

The product produced by this reaction, and which reaction was violent, was not a foam product and had substantially no cellular structure.

Example 5

A thermosetting reaction mixture was prepared at room temperature by mixing together the following formulation:

| | | Parts by Weight |
|---|---|---|
| 1. | Furfuryl alcohol | 100 |
| 2. | Surfactant (DC 193) | 2 |
| 3. | Blowing agent - Freon 11 | 10 |
| 4. | Acid catalyst - 85% phosphoric acid | 10 |
| | TOTAL | 122 |

The resinous reaction was very slow to proceed, and the foam product produced collapsed during the reaction and was substantially unusable.

Example 6

A reaction mixture was prepared as in Example 5, except for the use of the furfuryl-alcohol polymer in place of the furfuryl alcohol; however, the resulting reaction mixture did not produce an acceptable foam product. The reaction mixture formed a foam, but the foam structure substantially collapsed.

Example 7

Example 1 was repeated, employing in addition about 2 to 3 weight percent of styrene monomer. The resulting foam produced was characterized by a substantially closed-cell structure, as well as having the properties of the Example 1 foam.

As set forth in Examples 1, 2 and 7, the thermosetting foam product of the invention provided for a controllable reaction and the production of a substantially closed-cell, fine cellular structure, low-friability, high flame-resistant, modified phenol-formaldehyde, furfuryl-type foam suitable for use, for example, for foam-insulation purposes and for other purposes, where such products may be employed.

Example 3, directed to a prior-art phenol-formaldehyde foam, had low compressure strength and did not have acceptable friability, while the use of furfuryl alcohol with the phenol-formaldehyde resin in Examples 4 and 5 failed to produce a foam product or an acceptable foam product.

What I claim is:

1. A method for preparing a thermosetting foam product, which method comprises reacting a furfuryl-alcohol polymer with a phenol-formaldehyde resin, having a mole ratio of phenol to formaldehyde of from about 1:1.2 to 1:2.0, in the presence of a blowing agent and a catalytic amount of a strong acid catalyst, to effect the generally simultaneous condensation of the phenol-formaldehyde resin and the polymerization of the furfuryl-alcohol polymer, to provide an integral thermosetting foam produce characterized by low-friability, high-compressive-strength and good flame-retardant properties.

2. The method of claim 1 wherein the furfuryl-alcohol polymer comprises an acid-catalyzed furfuryl-alcohol polymer which generally comprises a head-to-tail polymerization of the furfuryl alcohol in the polymer chain, and having reactive hydroxyl groups in the polymer.

3. The method of claim 1 wherein the phenol-formaldehyde resin comprises a single-stage phenol-formaldehyde resin, and wherein the mole ratio of phenol to formaldehyde ranges from about 1:1.2 to 1:1.4.

4. The method of claim 1 wherein the acid catalyst comprises a sulfonic-acid catalyst.

5. The method of claim 4 wherein the sulfonic-acid catalyst comprises an alkene sulfonic acid or a toluene sulfonic acid.

6. The method of claim 1 which includes, in the reaction mixture, a cell-control amount of a silicone surfactant.

7. The method of claim 1 wherein the reaction is carried out at a temperature ranging from about 60° F. to 180° F.

8. The method of claim 1 wherein the amount of the furfuryl-alcohol polymer and the amount of the phenol-formaldehyde resin range from about 10% to 90% by weight of the reaction mixture.

9. The method of claim 1 wherein the blowing agent is present in an amount ranging from about 1 to 15 parts by weight of the polymer resin in the reaction mixture.

10. The method of claim 1 wherein the acid catalyst is present in an amount ranging from about 0.05 to 10 parts per 100 parts by weight of the resin polymer in the reaction mixture.

11. The method of claim 1 which includes adding from about 0.1 to 8.0 weight percent of the reaction mixture of a styrene monomer, to provide a substantially closed-cell foam product.

12. A method of preparing a thermosetting foam product, which method comprises reacting a furfuryl-alcohol polymer with a phenol-formaldehyde resin, having a mole ratio of phenol to formaldehyde of from about 1:1.2 to 1:2.0, in the presence of from about 1 to 15 parts per 100 parts of polymer and resin of a blowing agent and of from about 0.05 to 10 parts per 100 parts of polymer and resin of a catalytic amount of a sulfonic-acid catalyst and a small cell-control amount of a silicone surfactant, to effect the generally simultaneous condensation of the phenol-formaldehyde resin and the condensation of the furfuryl-alcohol polymer, the amount of the polymer and the resin ranging from about 10% to 90% by weight of the reaction mixture, and the polymer comprising an acid-catalyzed furfuryl-alcohol polymer which generally comprises a head-to-tail polymerization of the furfuryl alcohol in the polymer chain, and having reactive hydroxyl groups in the polymer, to provide an integral thermosetting foam product characterized by low-friability, high-compressive-strength and good flame-resistant properties.

13. The method of claim 12 which includes adding from about 0.5 to 5.0 weight percent of the reaction mixture of a styrene monomer, to provide a substantially closed-cell foam product.

14. The method of claim 1 wherein the furfuryl-alcohol polymer contains reactive hydroxyl groups in the polymer.

15. The method of claim 1 wherein the weight percent of the furfuryl-alcohol polymer and the phenol-formaldehyde resin varies from about 30% to 70%.

* * * * *

UNITED STATES PATENT AND TRADEMARK OFFICE
CERTIFICATE OF CORRECTION

PATENT NO. : 4,350,776
DATED      : September 21, 1982
INVENTOR(S): Stuart B. Smith It is certified that error appears in the above-identified patent and that said Letters Patent is hereby corrected as shown below:

Claim 5, line 2, delete "alkene" and insert therefor --alkane--.
Claim 9, line 3, insert --and-- between "polymer resin".
Claim 10, line 3, insert --and-- between "resin polymer".
Column 2, line 39, insert --and-- after "resin".
Column 3, line 1, insert --and-- between "resin polymer".

Signed and Sealed this

Fifth Day of April 1983

[SEAL]

Attest:

GERALD J. MOSSINGHOFF

Attesting Officer

Commissioner of Patents and Trademarks